United States Patent
Schubring et al.

(10) Patent No.: US 6,294,784 B1
(45) Date of Patent: Sep. 25, 2001

(54) PYROELECTRIC SENSOR SENSITIVITY ENHANCED BY ACTIVE HYSTERESIS EXCITATION

(75) Inventors: Norman William Schubring, Troy; Joseph Vito Mantese, Shelby Township; Adolph Louis Micheli, Harrison Township, Macomb County; Antonio Buddy Catalan, Sterling Heights, all of MI (US)

(73) Assignees: General Motors Corporation, Detroit; Delphi Technologies, Inc., Troy, both of MI (US)

( * ) Notice: Subject to any disclaimer, the term of this patent is extended or adjusted under 35 U.S.C. 154(b) by 0 days.

(21) Appl. No.: 09/241,149

(22) Filed: Feb. 1, 1999

(51) Int. Cl.[7] ........................................ G01J 5/10
(52) U.S. Cl. ............................... 250/338.3; 250/338.2
(58) Field of Search ............................... 250/338.3, 338.2

(56) References Cited

U.S. PATENT DOCUMENTS

| | | | |
|---|---|---|---|
| 5,272,341 | 12/1993 | Micheli et al. | 250/338.3 |
| 5,386,120 | 1/1995 | Micheli et al. | 250/338.2 |
| 5,448,067 | 9/1995 | Micheli | 250/338.2 |

FOREIGN PATENT DOCUMENTS

02166768-A  * 6/1990 (JP) ........................ H01L/27/14

* cited by examiner

*Primary Examiner*—Constantine Hannaher
(74) *Attorney, Agent, or Firm*—Jeffrey A. Sedlar; George A. Grove

(57) ABSTRACT

A ferroelectric/pyroelectric sensor that employs a technique for determining a charge output of a pyroelectric element of the sensor by measuring the hysteresis loop output of the element several times during a particular time frame for the same temperature. An external AC signal is applied to the pyroelectric element to cause the hysteresis loop output from the element to switch polarization. The frequency of the external AC signal is greater than the frequency of a chopper selectively applying a reference temperature and a scene temperature alternately to the pyroelectric element. Each time the chopper provides the reference temperature or the scene temperature to the element, the alternating external source covers multiple cycles so that the hysteresis loop output is switched multiple times for increased signal averaging. Because the shape and size of the loop is different for the reference temperature and the scene temperature, a comparison between the measured charge for both time periods can be provided to give a signal having an increased signal-to-noise ratio.

31 Claims, 3 Drawing Sheets

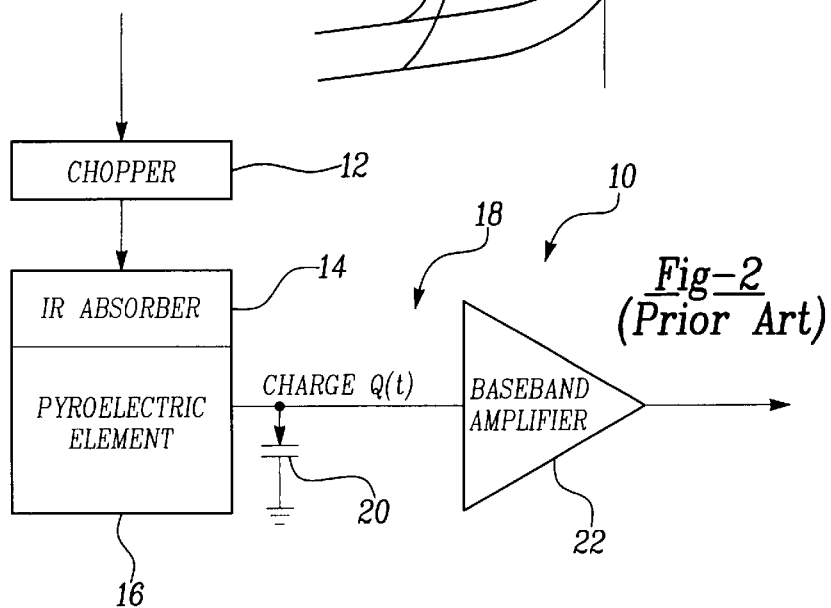
Fig-1
Fig-2 (Prior Art)
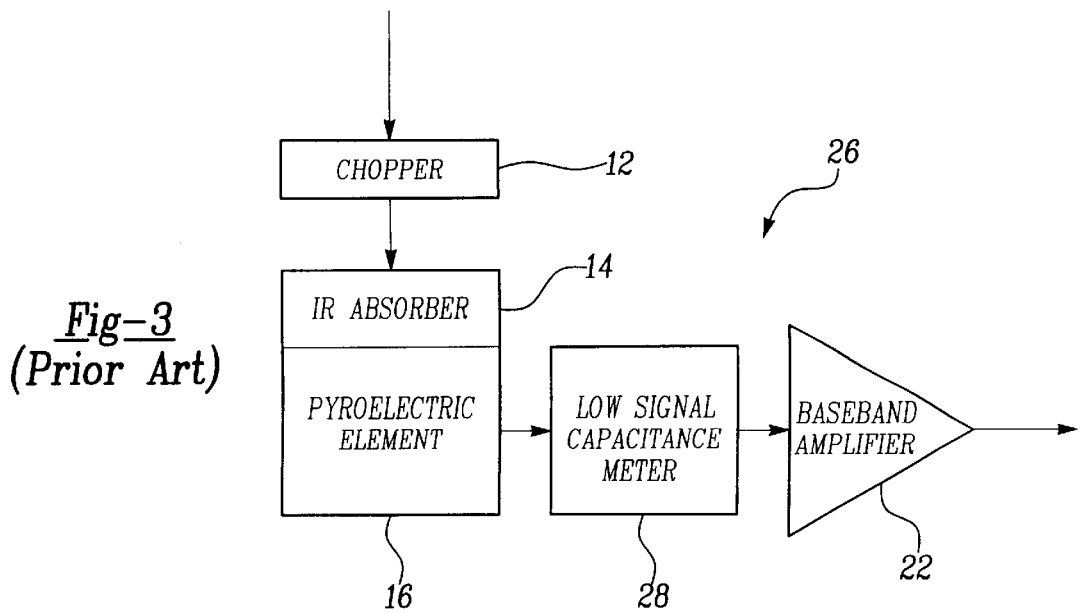
Fig-3 (Prior Art)

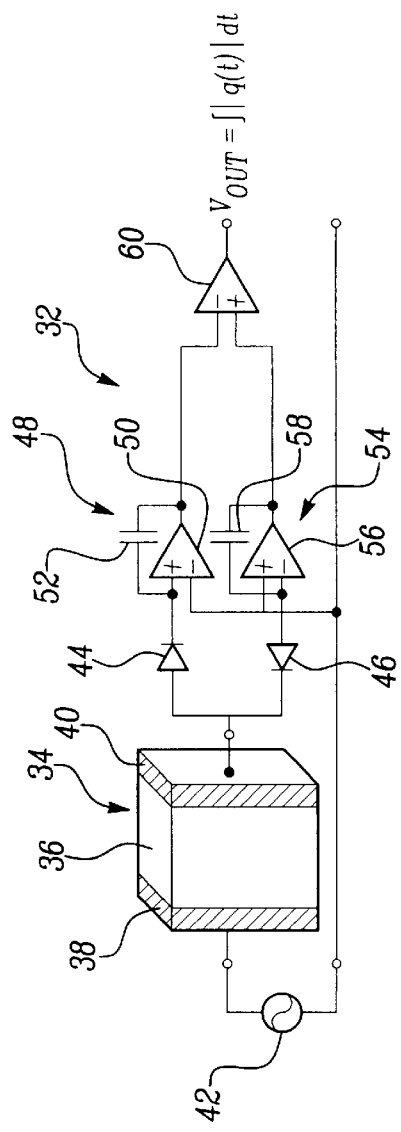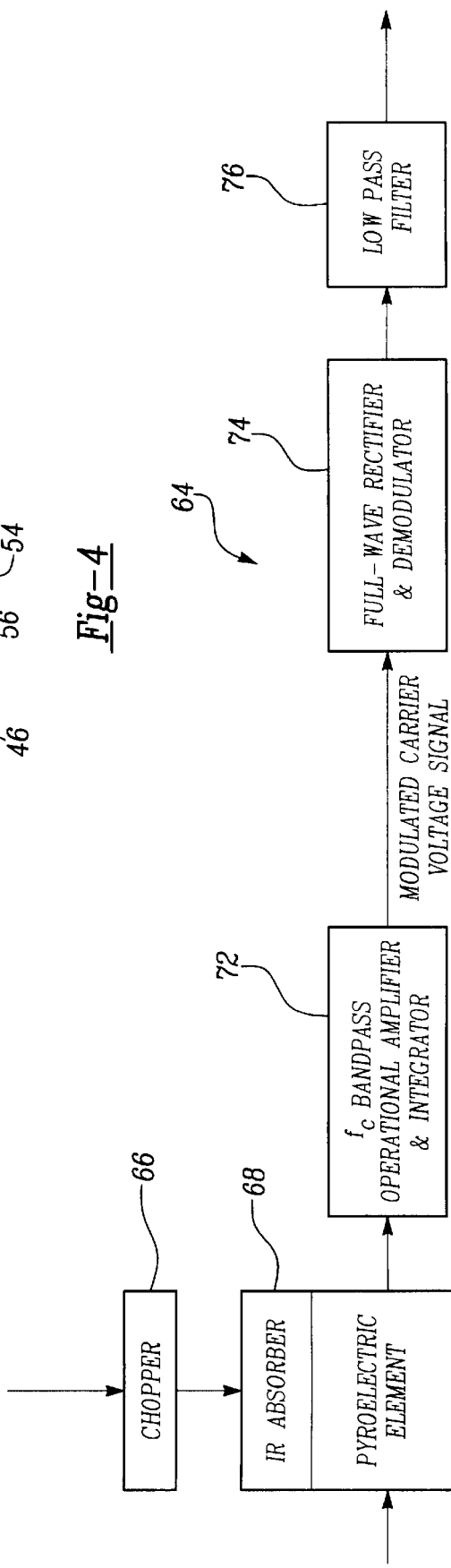

PYROELECTRIC SENSOR SENSITIVITY ENHANCED BY ACTIVE HYSTERESIS EXCITATION

BACKGROUND OF THE INVENTION

1. Field of the Invention

This invention relates generally to pyroelectric sensors and, more particularly, to a method of determining the polarization state of a pyroelectric element by applying an AC signal to the element and calculating, multiple times, the hysteresis loop switching energy of the element for a predetermined time frame, and comparing it to a reference switching energy at a corresponding reference temperature.

2. Discussion of the Related Art

A certain class of sensors make use of ferroelectric materials, and their pyroelectric effect for detection of temperature change. Sensors of this type have a wide range of applications, such as imaging in low visibility conditions, for example, poor weather conditions, night vision, etc. A ferroelectric material is a dielectric material that has a temperature dependent spontaneous electrical polarization in the absence of an externally applied electric field which can change state with the application of a critical field, where the polarization magnitude and direction within the ferroelectric material is identifiable by a hysteresis loop. The orientation of the polarization of the material can be changed by applying a reversing external electric field to the material. The electric dipoles within the material, that identify the orientation of the polarization, change when the external field is applied and in a proper circuit layout produce a hysteresis loop. Since spontaneous polarization is generally temperature dependent, ferroelectric materials can employ the pyroelectric effect for temperature detection purposes.

Any area of the hysteresis loop, either the entire saturated hysteresis area or merely a region of operation anywhere within the full loop, is representative of the switching energy required to change the polarization states of some or all the dipoles which make up the atomic lattice structure of the material at a given temperature for the specific state of excitation. Any change in radiation incident on the ferroelectric material, if absorbed, changes the temperature, and thus changes the associated loop area. FIG. 1 shows two charge versus voltage hysteresis loops for a particular ferroelectric material at a first temperature $T_1$ and a second temperature $T_2$. If plotted independent of physical dimensions, the magnitude of an externally applied alternating electric field is given on the horizontal axis and polarization, in charge density, is given on the vertical axis. The area of the charge versus voltage hysteresis loop of a ferroelectric material has dimensions of energy, and the loop area is a direct function of its temperature. The magnitude of the polarization changes with a change in the temperature of the ferroelectric material for a given electric field. A careful review of the two hysteresis loops in FIG. 1 will show that for the two different temperatures $T_1$ and $T_2$, the area within the loop is different. Consequently, an electrical measurement of the change in area anywhere within the major loop is an electrical signal corresponding to the change of the temperature of the material, and thus of the incident infrared radiation. The effect is of a dynamic nature due to the switching between polarization states of the pyroelectric material, and therefore, when measuring incident radiation, it is necessary to shutter the radiation, to reference the ferroelectric spontaneous polarization before each window opens to the scene.

Heretofore, all of the known ferroelectric/pyroelectric sensors that convert varying radiation energy to usable electrical signals greater than the inherent ambient noise of the sensor system operate in a passive mode. This means that the pyroelectric element operates at a given polarization state which is a function of temperature change, without any deliberate electrical polarization reversal. More specifically, passive pyroelectric detection only interrogates the polarization state of the ferroelectric material typically by measuring the net voltage across a poled capacitor structure, or by small signal AC excitation to determine the permittivity of the material (which is a function of the poled state), or some combination of these two methods. The practice in the industry to compare ferroelectric/pyroelectric sensors has been to measure the pyroelectric coefficient p, which is defined as the partial derivative of the displacement D with respect to the temperature T, $p=(\Delta D/\Delta T)$ at a given bias field, $E_B$. What this means is that for a physical geometry having sensor area A, the amount of coulombs of charge Q is generated per temperature T, and the pyroelectric coefficient p is expressed as: $p=(1/A)\ [\Delta Q/\Delta T]$. Unfortunately, this technique only represents a single cycle around a minor portion of the available signal energy as represented by the hysteresis loop area.

FIG. 2 shows a schematic block diagram of a known pyroelectric sensor system 10 that employs a conventional passive charge generation technique to determine the output of the sensor element. The sensor system 10 includes a chopper 12 that selectively gates radiation from a scene onto an infrared absorber 14 that is part of a pyroelectric element 16. The pyroelectric element 16 is made of a ferroelectric material that exhibits hysteresis loops which vary with temperature as shown in FIG. 1, and represents a single pixel element of the sensor system 10 that combines with other pixel elements (not shown) to generate an image, as is well understood in the art. The discussion herein is directed to an infrared imaging system, but as will be appreciated by those skilled in the art, sensor systems of this type are applicable to detect other wavelengths of radiation, including millimeter waves and microwaves.

The chopper 12 selectively blocks and passes the radiation directed to the pyroelectric element 16 at a predetermined frequency so that the pyroelectric element 16 sees a reference temperature when the chopper 12 is closed, and sees the temperature of the scene when the chopper 12 is open. The difference between the reference temperature and the scene temperature alters the shape of the hysteresis loop as shown in FIG. 1. The change in charge Q(t) 18 for the two loops is measured separately as a voltage across a sampling capacitor 20 and an amplifier 22, in a manner that is well understood in the art. Because no external electric field is applied to the pyroelectric element 16, the measured charge of the pyroelectric element 16 that charges the capacitor 20 for the two loops is the charge Q(t) where the hysteresis loop crosses the positive vertical axis for temperature $T_1$ and the charge Q(t) where the hysteresis loop crosses the positive vertical axis for temperature $T_2$. The sampling capacitor 20 stores the charge from the pyroelectric element 16 only each time the window is opened by the chopper 12. The effective pyroelectric coefficient p for this design is given as:

$$p=(1/A)[Q_1-Q_2]/[T_1-T_2]$$

In an alternate known design, the small signal level capacitance, i.e. (change in local slope of the Q versus V curve of either a poled or unpoled ferroelectric material) between the charge stored by the pyroelectric element 16 is measured for temperature $T_1$ and $T_2$ and then compared. FIG. 3 shows a schematic block diagram of a sensor system 26 including the chopper 12, the infrared absorber 14, the pyroelectric element 16 and the amplifier 22. Sometimes small bias voltage is applied to the pyroelectric element 16 from a bias source (not shown), and a capacitance meter 28 is used to measure the change in capacitance between the location on the hysteresis loop for both temperatures $T_1$ and $T_2$ relative to the bias voltage. Even though a small bias voltage is applied to the pyroelectric element 16 in this design, the mode of operation is still passive because the small bias voltage does not alter the polarization state of the ferroelectric material in any way, but merely measures its change in local permittivity as measured by a change in capacitance. The effective pyroelectric coefficient p is given as:

$$p=[(V_{rms})/A](\Delta C/\Delta T)$$

As is apparent, this detection scheme utilizes only a small portion of the hysteresis loop, and therefore the sensors are limited in their ability to differentiate signal from noise. Both of the techniques discussed above are dependent upon the condition that the ferroelectric material is left resident in one of its two spontaneous polarization states $P_s$ (+ or −), or some intermediate state thereof. The ability to measure the power from the pyroelectric element 16 between the temperature changes gives the sensitivity of the system. Because the signal-to-noise ratio is relatively low for the prior art sensors, this establishes the sensitivity of the entire system. Robust and relatively expensive system components, such as the chopper 12 and the amplifier 22 cannot increase the signal from noise, but only can prevent further degradation.

What is needed is a ferroelectric/pyroelectric sensor that measures more of the available signal energy from the hysteresis loop output from the pyroelectric element to provide a better signal-to-noise ratio than is currently available in the prior art sensors. It is therefore an object of the present invention to provide such a sensor.

SUMMARY OF THE INVENTION

In accordance with the teachings of the present invention, a ferroelectric/pyroelectric sensor is disclosed that employs a technique of active excitation of the ferroelectric material by respectively changing its polarization state during a particular time period. An external AC signal is applied to the pyroelectric element to cause the hysteresis loop output from the element to cover a portion of the loop in accordance with the polarization direction change. The frequency of the external AC signal is greater man the frequency of a chopper that selectively and alternately applies a reference temperature and a scene temperature to the pyroelectric element. Each time the chopper provides the reference temperature or the scene temperature to the element, the external AC signal goes through multiple cycles so that the hysteresis loop output is switched multiple times for increased signal averaging. Because the shape and size of the loop changes for the reference temperature and the scene temperature, a comparison between the measured charge for the alternating reference and scene time periods can be provided to give a signal having an increased signal-to-noise ratio.

Additional objects, advantages, and features of the present invention will become apparent from the following description and appended claims, taken in conjunction with the accompanying drawings.

BRIEF DESCRIPTION OF THE DRAWINGS

FIG. 1 is a graph with charge on the vertical axis and voltage potential on the horizontal axis showing the hysteresis loop response of a pyroelectric element for both temperature $T_1$ and temperature $T_2$;

FIG. 2 is a schematic block diagram of a known passive pyroelectric sensor system;

FIG. 3 is a schematic block diagram of another known passive pyroelectric sensor system;

FIG. 4 is a schematic diagram of an active pyroelectric sensor system, according to an embodiment of the present invention;

FIG. 5 is a block diagram of another active pyroelectric sensor system of the invention.

DETAILED DESCRIPTION OF THE PREFERRED EMBODIMENTS

Figure 6:
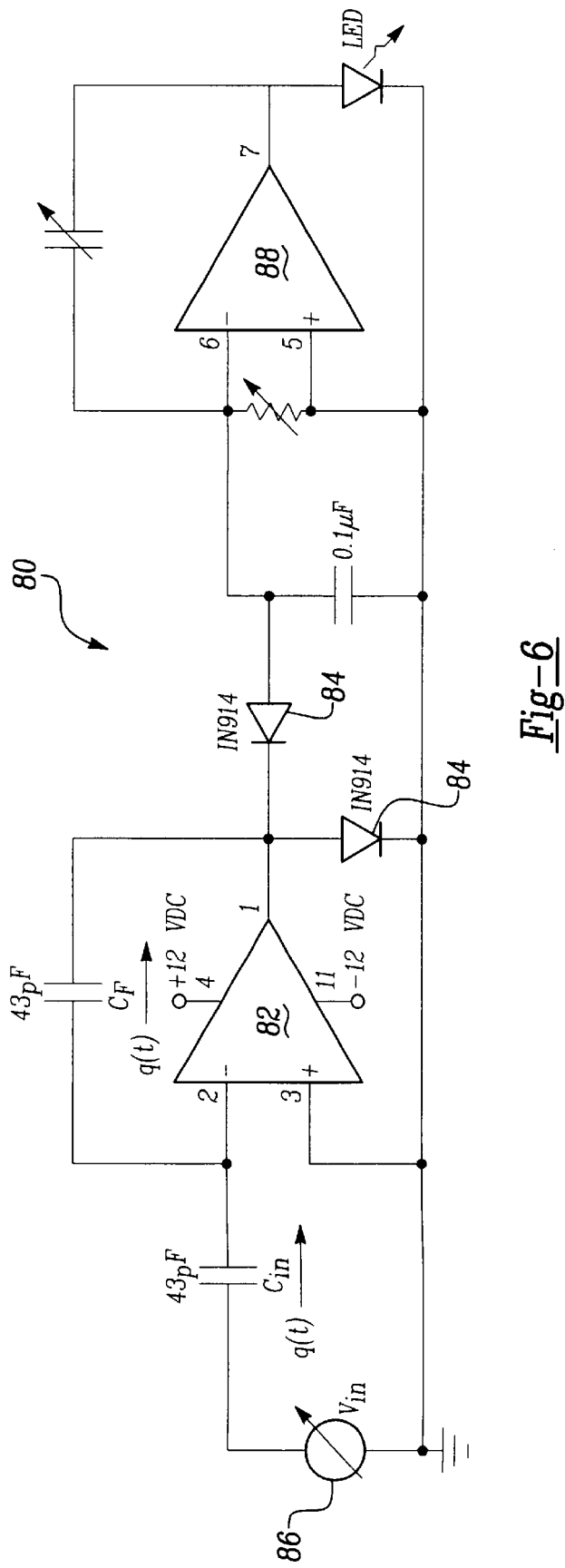
FIG. 6 is a schematic diagram of another active pyroelectric sensor system according to the invention.

The following description of the preferred embodiments directed to an active pyroelectric sensor system is merely exemplary in nature, and is in no way intended to limit the invention or its applications or uses.

Because the conventional pyroelectric sensor designs discussed above do not switch $P_s$ from its initial state during interrogation, closer analysis suggests that the large energy product of the ferroelectric material identified by the hysteresis loop has not yet been fully exploited by the industry. The product of the remnant polarization $P_r$ in the fully polarized state, and the coercive electric field $E_c$ required to remove all such residual polarization, is generally identified as the energy product $P_r E_c$. This $P_r E_c$ product has the dimensions of energy density, which serves to compare the "hardness" or energy storage capabilities of such materials. Hence, by employing $P_s$ switching, this invention proposes that the entire hysteresis loop may be traversed numerous times at a given temperature to provide a static measurement with an enhanced signal-to-noise ratio. This rail-to-rail switching of the $P_s$ is tantamount to active operation of the ferroelectric material at a significant power level, as opposed to the very weak levels in the traditional passive or near passive techniques discussed above. As the temperature of the sensor changes, the area within the hysteresis loop changes, and this change can be rapidly monitored due to the active nature of the sensor design.

The area within the hysteresis loop represents the energy dissipated per cycle of excitation. Thus, the continuously alternating excitation of the ferroelectric material causes dissipation of energy at some equilibrium temperature level. However, this level of dissipation is continuously modulated by the external heat applied to, or drawn from, the sensor (scene energy), and it is this change in equilibrium level that represents the change in temperature in each pixel element of the sensor system as required for an electrical output thereof. The loop area difference associated with the two different temperatures $T_1$ and $T_2$ represents stored polarization energy delivered by or received at the ferroelectric energy storage device. This polarization dependent energy change is the difference between the two dissipation energy levels as a result of the cyclical V field excitation. By the active nature of the sensor circuitry of the invention, the accuracy in measurement of this small energy change is enhanced by the frequency of measurement; i.e., bandwidth limiting, signal summing, and noise averaging.

The invention described herein fully exploits all of the temperature-sensitive energy stored in the atomic structure of the pyroelectric material, as accomplished by AC excitation actively traversing the entire saturated major hysteresis loop. This carrier frequency permits signal summing many times per chopper window. In essence, it is an active amplification process in that the external AC excitation is employed to vigorously stimulate all of the energy stored in the lattice of the pyroelectric material, and this high level of power is now controlled by the minor infrared perturbation signal of the incident radiation.

FIG. 4 is a schematic diagram of a pyroelectric sensor system 32, according to an embodiment of the present invention, that provides the active pyroelectric element excitation discussed above. The system 32 includes a pyroelectric element 34 that includes a block 36 of ferroelectric material sandwiched between two electrodes 38 and 40. An alternating current source 42 applies an alternating voltage potential to the electrode 38 at a predetermined frequency. A chopper (not shown in FIG. 4) selectively allows radiant energy from a scene to impinge the block 36 when the shutter is opened, and provide a reference temperature to the ferroelectric element 34 when the shutter is closed at a predetermined frequency. The charge generated by the voltage potential from the source 42 and the charge generated by the ferroelectric block 36 from the incident radiation is collected by the electrode 40. The voltage potential from the source 42 is large enough so that the charge drives the hysteresis loop output of the block 36 from an entire loop. As the temperature applied to the pyroelectric element 34 changes in response to the operation of the chopper, the shape and area of the hysteresis loop changes accordingly, consistent with the discussion above.

The output voltage collected by the electrode 40 is applied to a first rectifying diode detector 44 and a second rectifying diode detector 46. When the voltage potential from the source 42 is positive, the detector 44 conducts, and when the voltage potential from the source 42 is negative, the detector 46 conducts. When the detector 44 is conducting, the charge from the pyroelectric element 34 is applied to an integrator 48 that includes an amplifier 50 and an integrating capacitor 52. Each time the detector 44 conducts, charge is added to the capacitor 52 and is amplified by the amplifier 50. An integrator 54, including an amplifier 56 and an integrating capacitor 58, accumulates the charge when the detector 46 is conducting, so that combination of the two integrators 48 or 54 continuously accumulates charge.

A summer 60 is continuously adding the charge from both of the integrators 48 and 54 to provide a summed charge output. An output of the summer 60 is sent to further processing circuitry (not shown) to provide a signal indicative of the one pixel of the image. A reset device (not shown) will reset the summer 60 in sync with the frequency of the chopper. Therefore, for a particular time frame for one temperature, the output from the summer 60 is the charge accumulated over multiple loop swings. In other words, the frequency of the source 42 is set so that for each time the chopper is closed, the charge generated by element 34 through the hysteresis loop for the temperature $T_1$ will be measured several times. Likewise, when the chopper is opened, the charge generated by the element 34 through the hysteresis loop for the temperature $T_2$ is measured the same amount of times. In one embodiment, for example, the AC frequency from the source 42 is set at 1.5 kHz and the chopper period is set at 15 frames per second, giving 100 polarization cycles through the hysteresis loop per chopper window. The summer 60 is zeroed after each time period so that the two values can be compared. Therefore, not only does the charge get measured for the entire hysteresis area for a particular chopper time window, but gets measured multiple times over that time period, significantly increasing the signal-to-noise level over the sensors described above in the prior art.

The amplitude of the AC signal from the source 42 can be selected to drive the hysteresis loop from rail-to-rail to cover the entire charge available from the pyroelectric element 34. This gives a full polarization reversal of the element 34 for each AC cycle. Alternately, the amplitude of the AC signal can be reduced to only cover a portion of the hysteresis loop, but the multiple charge measurements during the particular time frame still provides significant signal averaging over those pyroelectric sensor systems known in the art. By only covering a portion of the hysteresis loop, the element 34 only undergoes a partial polarization reversal. It should be noted that a DC bias can be applied to the element 34 in addition to the AC signal to define a different coverage of the hysteresis loop. As long as the magnitude of the AC signal does not exceed the coercive strength of the loop, causing the pyroelectric element 30 to break down, the multiple signal averaging technique of the invention will benefit the signal-to-noise ratio.

FIG. 5 shows a block diagram of a pyroelectric sensor system 64, according to the invention, showing the operation of the invention as just described. A chopper 66 intermittently applies radiation to an infrared absorber 68 that is part of a pyroelectric element 70 in the manner as discussed above. Additionally, a constant amplitude frequency signal is applied to the pyroelectric element 70 from the source 42. The charge Q(t) for the full rail-to-rail saturation of the hysteresis loop of the pyroelectric element 70 is applied to a $f_c$ bandpass operational amplifier and integrator, representing the integrators 48 and 54 above. The modulated carrier voltage signal from the integrator is applied to a full-wave rectifier and demodulator 74 representing the detectors 44 and 46 above, and then to a low pass filter 76 to get the electrical output signal.

FIG. 6 is a schematic diagram of a pyroelectric sensor system 80 according to the invention that is an implementation that exploits all of the generated energy at the sensor by active amplification of the charge of the sensor system 32, discussed above. The system 80 includes a capacitor $C_F$ that accumulates the charge from the pyroelectric element, that is amplified by an operational amplifier 82, such as a JFET operational amplifier, TL084CN. A pair of diode detectors 84 detect the charge from the element, as generated by an AC source 86. An operational amplifier 88 acts as a summer to sum the integrated charge. The sensor system 80 provides the same charge accumulation for both the positive and negative components of the AC signal to provide the multiple charge additions over the hysteresis loop. The particular device components are labeled in the figure for this embodiment.

The discussion above provides signal averaging to increase signal-to-noise ratio in a pyroelectric sensor. Additionally, because the sensor circuitry does not employ many resistors, the Johnson noise of the sensor is further reduced. The technique of the invention has application to other types of sensors, detectors and devices that do not make use of ferroelectric materials and the pyroelectric effect but exhibit a hysteresis loop output. Particularly, if a certain material exhibits a hysteresis loop response to an input signal, then the multiple signal averaging technique of the invention may be applicable to those types of systems. Another type of sensor may include a magnetic type material exhibiting a hysteresis type loop response to external stimuli, such as strain.

The foregoing discussion discloses and describes merely exemplary embodiments of the present invention. One skilled in the art will readily recognize from such discussion, and from the accompanying drawings and claims, that various, changes, modifications and variations can be made therein without departing from the spirit and scope of the invention as defined in the following claims.

What is claimed is:

1. A pyroelectric sensor system comprising:
   an alternating voltage source generating an alternating voltage at a predetermined frequency;
   a pyroelectric sensor element responsive to the alternating voltage, said pyroelectric sensor element generating a hysteresis loop charge output in response to the alternating voltage, said alternating voltage driving the sensor element over at least a portion of the hysteresis loop output of the element, said pyroelectric sensor element having a composition so that the alternating voltage causes a polarization reversal of dipoles in the element in response to positive and negative changes of the alternating voltage; and
   a charge integration system responsive to the charge output from the pyroelectric sensor element, said integration system determining the area within the hysteresis loop defined by the hysteresis loop output and generating a signal indicative of the charge output from the sensor element.

2. The system according to claim 1 further comprising a chopper, said chopper alternating blocking and passing incident radiation directed towards the sensor element at a predetermined frequency.

3. The system according to claim 2 wherein the pyroelectric sensor element is responsive to a reference temperature when the chopper blocks the incident radiation and is responsive to a scene temperature when the chopper passes the incident radiation.

4. The system according to claim 2 wherein the chopper has a frequency that is less than the frequency of the alternating voltage so that multiple positive and negative components of the alternating voltage are applied to the pyroelectric sensor element during a particular chopper window defined by the chopper frequency.

5. The system according to claim 4 wherein the charge integration system accumulates charge for each chopper window so that it accumulates charge for multiple cycles of the hysteresis loop output of the pyroelectric sensor element and separately identifies the accumulated charge for each chopper window so that it accumulates charge.

6. The system according to claim 1 wherein the alternating voltage has a potential that is large enough to drive the hysteresis loop charge output to provide a full polarization reversal for each alternating voltage cycle.

7. The system according to claim 1 wherein the alternating voltage has a potential that only drives the hysteresis loop charge output over a portion of the polarization reversal for each alternating voltage cycle.

8. The system according to claim 1 further comprising a bandwidth limiting filter that receives the hysteresis loop charge output and provides bandwidth filtering of the output.

9. The system according to claim 1 wherein the pyroelectric sensor element includes a ferroelectric material positioned between a first capacitive plate and a second capacitive plate, said alternating voltage being applied to the first capacitive plate and said hysteresis loop charge output being taken from the second capacitive plate.

10. The system according to claim 1 wherein the sensor system is an infrared imaging system and the sensor element includes an infrared absorber that absorbs infrared radiation directed at the sensor element from a scene.

11. A pyroelectric sensor system comprising:
    an alternating voltage source generating an alternating voltage at a predetermined frequency;
    a pyroelectric sensor element responsive to the alternating voltage, said pyroelectric sensor generating a hysteresis loop charge output that follows a hysteresis loop of the element in response to the alternating voltage, said hysteresis loop of the sensor element changing shape when the sensor element changes temperature, said pyroelectric sensor element having a composition so that the alternating voltage causes a polarization reversal of dipoles in the element in response to positive and negative changes of the alternating voltage;
    a chopper alternately blocking and passing incident radiation directed towards the sensor element at a predetermined frequency, wherein a reference temperature is applied to the sensor element when the chopper is closed and blocks the incident radiation and a scene temperature is applied to the sensor element when the chopper is open and passes the incident radiation, said chopper having a frequency that is less than the frequency of the alternating voltage so that multiple positive and negative components of the alternating voltage are applied to the pyroelectric sensor element each time the chopper is either opened or closed; and
    a processing system responsive to the hysteresis loop charge output from the sensor and determining the area within the hysteresis loop of the hysteresis loop output, said signal processing system separately detecting and integrating the charge output each time the chopper is opened and closed to provide a comparison of the reference temperature and the scene temperature.

12. The system according to claim 11 wherein the alternating voltage has a potential that is large enough to drive the hysteresis loop charge output to provide a full polarization reversal for each alternating voltage cycle.

13. The system according to claim 11 wherein the alternating voltage has a potential that only drives the hysteresis loop charge output over a portion of the polarization reversal for each alternating voltage cycle.

14. The system according to claim 11 further comprising a bandwidth limiting filter that receives the hysteresis loop charge output and provides bandwidth filtering of the output.

15. The system according to claim 11 wherein the processing system detects and accumulates the charge output of the hysteresis loop charge output swing multiple times each time the chopper blocks or passes the incident radiation to provide signal averaging.

16. The system according to claim 11 wherein the processing system includes a first detector responsive to the hysteresis loop charge output and a second detector responsive to the hysteresis loop charge output, said first detector generating a first voltage output from positive components of the alternating voltage and said second detector generating a second voltage output from negative components of the alternating voltage.

17. The system according to claim 16 wherein the processing system includes a first integrator responsive to the first voltage output and a second integrator responsive to the second voltage output, said first integrator adding the first voltage output for multiple positive components of the alternating voltage and the second integrator adding the second voltage output for multiple negative components of the alternating voltage, said integration system further including a summer responsive to the first added voltage output and the second-added voltage output.

18. The system according to claim 11 wherein the sensor system is part of an infrared imaging system for imaging a scene.

19. A method of determining a charge output from a pyroelectric element, said method comprising the steps of:

applying an alternating voltage to the pyroelectric element, said pyroelectric element having a composition so that the alternating voltage causes a polarization reversal of dipoles in the element in response to positive and negative changes of the alternating voltage;

detecting a hysteresis loop charge output of the pyroelectric element over a predetermined time period;

determining the area within the hysteresis loop of the hysteresis loop output; and integrating the detected charge output over a plurality of cycles of the alternating voltage for the predetermined time period.

20. The method according to claim 19 further comprising the steps of alternately applying reference radiation at a reference temperature and incident radiation at a scene temperature to the pyroelectric element for predetermined time periods and separately integrating the detected output for the time periods.

21. The method according to claim 20 further comprising the step of comparing the integrated outputs for the reference radiation time periods and the scene radiation time periods.

22. The method according to claim 20 wherein the step of alternately applying the reference radiation and the incident radiation includes using a chopper to selectively pass and block the incident radiation at a predetermined frequency where the frequency of the chopper is less than the frequency of the alternating voltage.

23. The method according to claim 19 wherein integrating the detected output includes separately detecting and integrating multiple positive components and negative components of the alternating voltage for each chopper window.

24. The method according to claim 19 wherein the magnitude of the alternating voltage is large enough to drive the hysteresis output to a full polarization reversal for each alternating voltage cycle.

25. The method according to claim 19 wherein the magnitude of the alternating voltage is selected to provide a limited polarization reversal for each cycle of the alternating voltage.

26. A method of determining a charge output from a pyroelectric element, said method comprising the steps of:

driving the pyroelectric element with an alternating voltage so that the alternating voltage causes the pyroelectric element to cover at least a portion of a hysteresis loop output of the element to provide at least a partial polarization reversal of the element;

detecting the hysteresis loop output of the pyroelectric element as a charge output over a predetermined time period;

integrating the detected output over a plurality of hysteresis loop cycles of the hysteresis loop output from the element for the predetermined time period; and comparing the integrated charge output to the integrated charge output from a previous time period to provide increased signal averaging.

27. The method according to claim 26 wherein the time period is defined by a chopper that alternately passes and blocks incident radiation directed towards the pyroelectric element to provide a comparison between a reference temperature and a scene temperature.

28. A system that exhibits a hysteresis loop output response to an input signal, said system comprising:

an alternating voltage source generating an alternating voltage at a predetermined frequency;

a system element responsive to the alternating voltage, said system element generating a hysteresis loop charge output in response to the alternating voltage, said alternating voltage driving the system element over at least a portion of the hysteresis loop output of the element, said system element having a composition so that the alternating voltage causes a polarization reversal of dipoles in the element in response to positive and negative changes of the alternating voltage; and a charge integration system responsive to the charge output from the system element, said charge integration system measuring multiple polarization reversals of the element for each positive and negative component of the alternating voltage, said integration system determining the area within the hysteresis loop of the hysteresis loop output and generating a signal indicative of the charge output from the sensor element.

29. A method of determining a charge output from a hysteresis loop element, said method comprising the steps of:

applying an alternating voltage to the hysteresis loop element, said hysteresis loop element having a composition so that the alternating voltage causes a polarization reversal of the alignment of dipoles in the element in response to positive and negative changes of the alternating voltage;

detecting a hysteresis loop charge output of the hysteresis loop element for multiple polarization reversals over a predetermined time period;

determining the area within the hysteresis loop of the hysteresis loop output; and integrating the detected charge output over a plurality of cycles of the alternating voltage for the predetermined time period.

30. A pyroelectric sensor system comprising:

an alternating voltage source generating an alternating voltage at a predetermined frequency;

a pyroelectric sensor element responsive to the alternating voltage, said pyroelectric sensor element generating a hysteresis loop charge output in response to the alternating voltage, said alternating voltage driving the sensor element over at least a portion of the hysteresis loop output of the element; and a charge integration system responsive to the charge output from the pyroelectric sensor element, said integration system generating a signal indicative of the charge output from the sensor element, said charge integration system including a first detector responsive to the hysteresis loop charge output and a second detector responsive to the hysteresis loop charge output, said first detector generating a first voltage output from positive components of the alternating voltage and said second detector generating a second voltage output from negative components of the alternating voltage.

31. The system according to claim 30 wherein the charge integration system further includes a first integrator responsive to the first voltage output and a second integrator responsive to the second voltage output, said first integrator adding the first voltage output for multiple positive components of the alternating voltage and the second integrator adding the second voltage output for multiple negative components of the alternating voltage, said integration system further including a summer responsive to the first added voltage output and the second added voltage output.

* * * * *